United States Patent [19]

Graber

[11] 4,386,709
[45] Jun. 7, 1983

[54] BICYCLE SUPPORT DEVICE

[76] Inventor: Joseph V. Graber, 3739 County Trunk M, Middleton, Wis. 53562

[21] Appl. No.: 386,938

[22] Filed: Jun. 10, 1982

Related U.S. Application Data

[62] Division of Ser. No. 241,099, Mar. 6, 1981, Pat. No. 4,345,705.

[51] Int. Cl.³ ............................................... B60D 3/06
[52] U.S. Cl. ................................ 211/20; 224/42.03 B
[58] Field of Search ................. 224/309, 42.03 B, 314; 211/17, 20

[56] References Cited

U.S. PATENT DOCUMENTS 3,901,421  8/1975  Kalicki et al.
3,994,425  11/1976  Graber
4,039,106  8/1977  Graber .......................... 224/42.03 B Primary Examiner—Steven M. Pollard
Attorney, Agent, or Firm—Vernon J. Pillote

[57] ABSTRACT

A bicycle support device including a pair of upwardly opening channels for receiving the wheels of a bicycle mounted in relatively parallel relation on a pair of cross frame members and having bicycle support members swingably mounted on the lower ends of a respective one of the cross frame members for movement between a lower folded position between the channels and a raised support position extending upwardly from the respective cross frame member at an acute angle to the horizontal to cross each other at a location intermediate their ends, with a fastener detachably interconnecting the bicycle support members intermediate their ends at a crossing location. The channels have a stepped V-shaped cross-section to accommodate bicycle tires of widely different size. The channels are provided with outwardly rolled rims along their upper edges. Wheel engaging devices are slidably mounted in the rolled rims for adjustment in a direction lengthwise of the channels.

10 Claims, 16 Drawing Figures

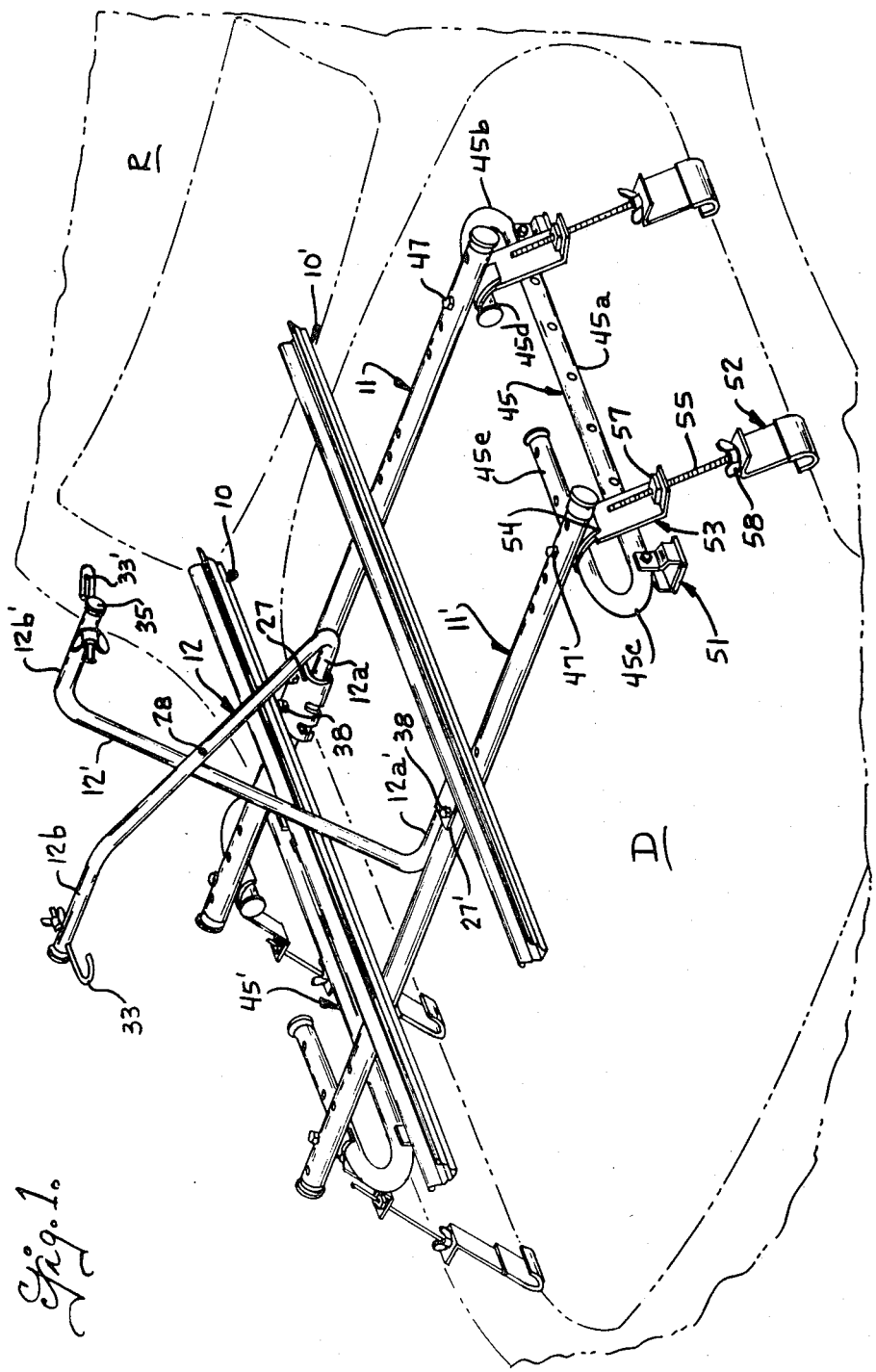

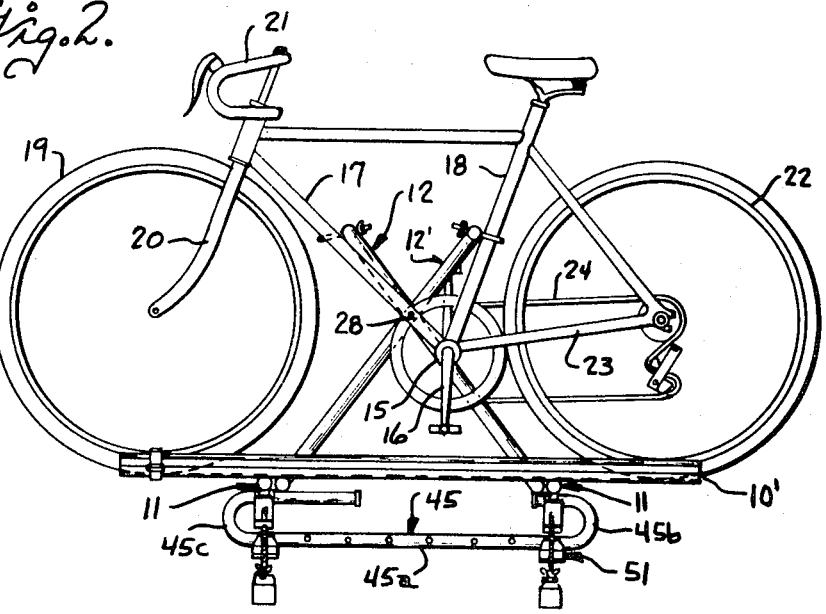
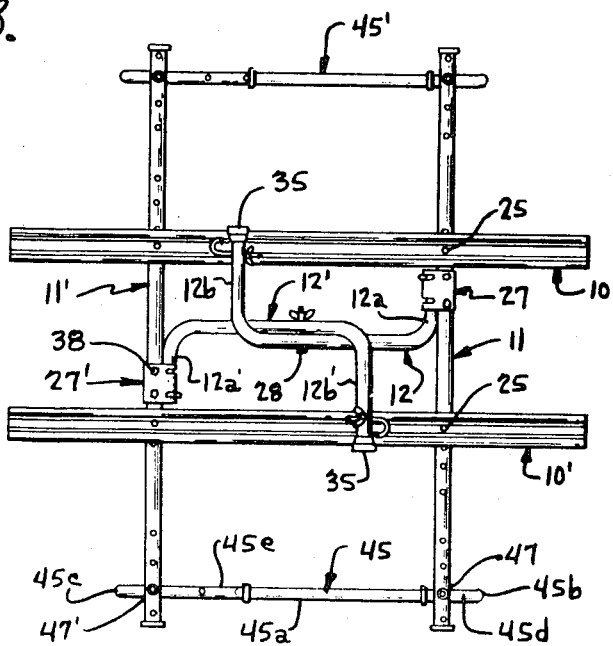

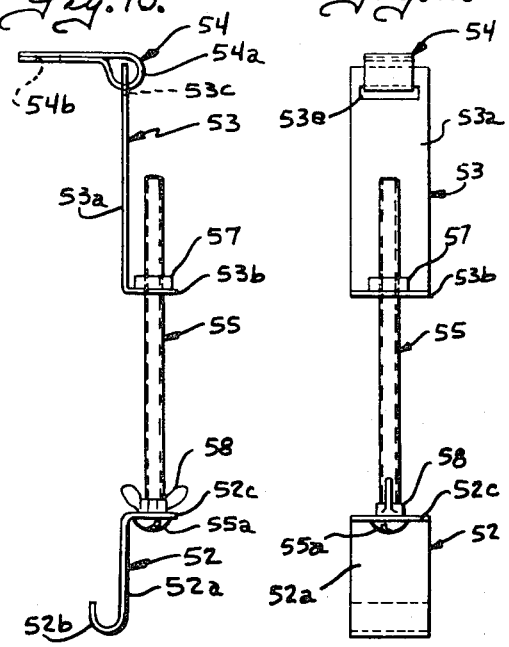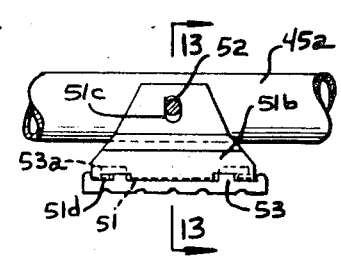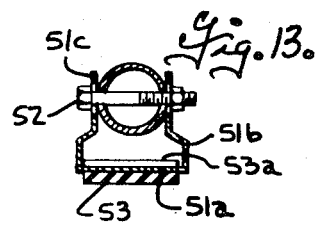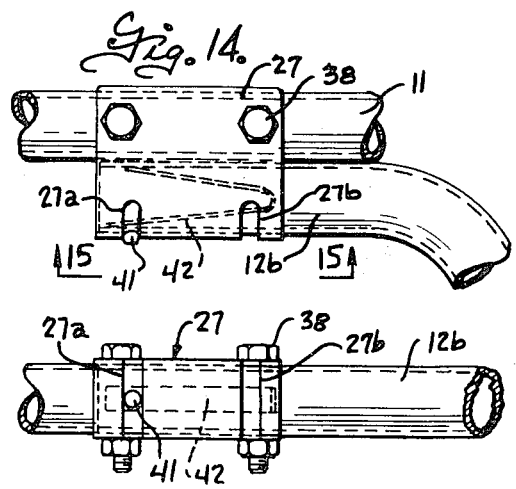

BICYCLE SUPPORT DEVICE

CROSS-REFERENCE TO RELATED APPLICATIONS

This application is a division of applicant's copending application Ser. No. 06/241,099, filed Mar. 6, 1981, now U.S. Pat. No. 4,345,705 issued Aug. 24, 1982.

This application is related to applicant's copending application Ser. No. 06/281,963, filed July 10, 1981.

BACKGROUND OF THE INVENTION

U.S. Pat. Nos. 3,901,421; 3,994,425 and 4,039,106 disclose bicycle carriers adapted for mounting on the roof or deck lid of an automobile and which utilize a pair of upwardly opening channels mounted in relatively parallel relation on a pair of cross frame members for receiving the wheels of the bicycles, and an upwardly extending bicycle support frame intermediate the channels for engaging and supporting the bicycles resting in the channels. The bicycle support frame of the carriers in the above patents project a substantial distance above the vehicle, particularly when the carrier is mounted on the vehicle roof, and effectively precludes driving the automobile into a garage while the carrier is mounted on the vehicle. While some of the bicycle carriers disclosed in the aforementioned patents are capable of being partially disassembled to remove the upwardly extending bicycle support frame, such partial disassembly would be inconvenient and time consuming, particularly if done while the carrier is mounted on the vehicle.

The bicycle carriers in the aforementioned patents have vehicle engaging feet adapted to rest on the roof or trunk lid of an automobile and vehicle engaging strap and hook assemblies for engaging the edge portion of the roof or deck lid on the automobile to anchor the carrier to the automobile. However, the size and shape of the deck lids on automobiles varies widely in different makes and models of automobiles, and the vehicle engaging feet and the vehicle engaging hook assemblies of the carriers in the arorementioned patents could not be adjusted in a direction lengthwise of the vehicle to provide optimum positioning on the long as well as the shorter trunk decks.

SUMMARY OF THE INVENTION

It is an object of the present invention to provide a vehicle attached bicycle carrier of the type utilizing a pair of upwardly opening channels for receiving wheels of the bicycles and a support frame intermediate the channels for supporting the bicycles resting in the channels, in which the support frame can be readily folded and releasably retained in a position intermediate the channels to thereby allow the vehicle to be driven into a garage without removing the carrier and to also allow the carrier to be utilized for carrying other items.

Another object of this invention is to provide a vehicle attached carrier of the type having vehicle engaging feet adapted to rest on the roof or deck lid of the automobile and vehicle engaging hook assemblies for engaging an edge portion of the roof or deck lid, in which the positions of the vehicle engaging feet and vehicle engaging hook assemblies on the carrier can be adjusted in a direction lengthwise of the vehicle to accommodate deck lids of different lengths.

Another object of this invention is to provide a vehicle attached carrier adapted to be mounted on the roof or deck lid of an automobile having an improved vehicle engaging hook assembly which is of all metal construction to avoid the use of parts such as straps which are subject to stretch and which vehicle engaging hook assembly can be easily adjusted to securely clamp the carrier to the vehicle.

Still another object of this invention is to provide a bicycle support rack of the type that utilizes a channel for receiving the front and rear wheels of a bicycle, and wherein the channel is adapted to firmly grip bicycle tires of widely different size.

Yet another object of this invention is to provide a bicycle support rack of the type that utilizes a channel for receiving the front and rear wheels of a bicycle, and wherein the channel has provision for permanently retaining a wheel anchor thereon while allowing adjustment of the wheel anchor therealong to accommodate bicycles having different wheel bases.

These, together with other objects and advantages of this invention will be more readily understood by reference to the following detailed description, when taken in connection with the accompanying drawings wherein:

FIG. 1 is a perspective view of the automobile attached bicycle carrier shown mounted on the trunk deck of an automobile;

FIG. 2 is a side elevational view of the bicycle carrier with a bicycle shown mounted thereon;

FIG. 3 is a top plan view of the automobile attached bicycle carrier;

FIG. 10 is a side elevational view of one of the vehicle engaging hook assemblies;

FIG. 11 is a front elevational view of the vehicle engaging hook assembly of FIG. 10;

FIG. 12 is a fragmentary side elevational view illustrating one of the vehicle engaging feet;

FIG. 13 is a fragmentary transverse sectional view on the plane 13—13 of FIG. 12;

FIG. 14 is a fragmentary plan view illustrating the mounting of one of the bicycle support members on the cross-frame member;

FIG. 15 is a fragmentary front elevational view taken on the plane 15—15 of FIG. 14; and FIG. 16 is a fragmentary exploded perspective view of the wheel receiving channel and adjustable wheel holding member.

Figure 5:
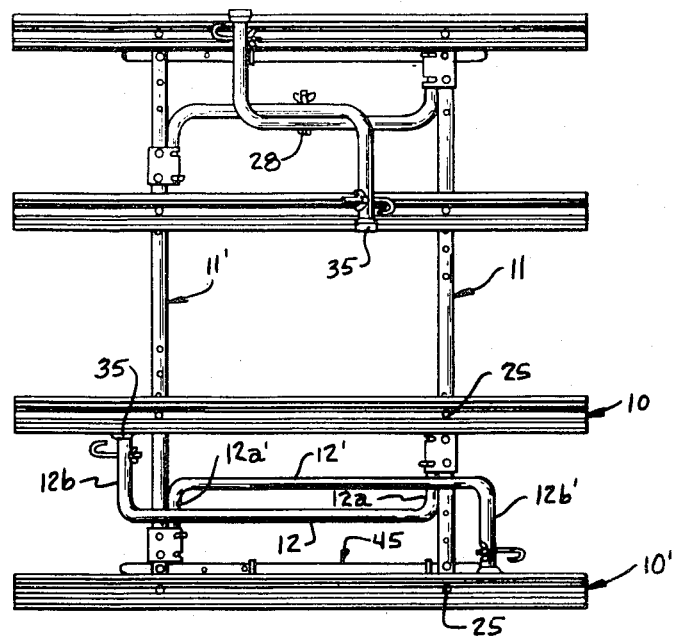
FIG. 5 is a top plan view of the bicycle carrier modified for carrying four bicycles.

The automobile attached bicycle carrier is adapted for mounting on either the trunk deck D or on the roof R of an automobile and, in general, include at least one pair of elongated upwardly opening channels 10, 10' which are mounted in the laterally spaced relatively parallel relation on cross-frame members 11, 11', and a bicycle support frame including first and second elongated bicycle support members 12 and 12' respectively mounted on the cross frame members 11 and 11' and extending upwardly between the channels for engaging a portion of the frame of a bicycle resting in each of the channels.

A typical bicycle is shown in FIG. 2 mounted on the carrier and includes a hub 15 for rotatably supporting the crank 16, front and rear frame members 17 and 18 which extend upwardly from the hub 15, a front wheel 19 rotatably supported in a fork 20 controlled by handle bars 21. A rear wheel 22 is rotatably mounted on a rearwardly extending frame 23 and driven by a chain and sprocket arrangement 24. The channels 10, 10' are selected to have a length slightly greater than the wheel base of the bicycle so as to receive the front and rear wheels 19 and 22 of the bicycle therein to support the bicycle and also inhibit turning of the front wheel about the fork axis.

Figure 6:
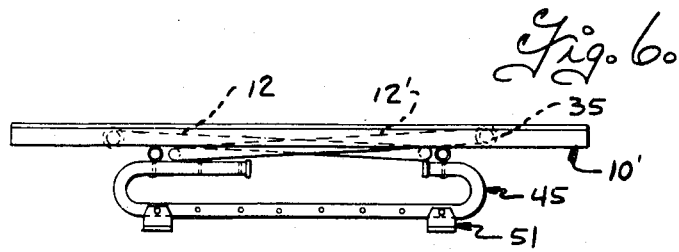
FIG. 6 is a side elevational view of the bicycle carrier with the bicycle support frame in a folded position.

The cross frame members 11, 11' are preferably formed of tubular stock and the channels 10, 10' are detachably secured to the cross frame members 11, 11' as by bolts 25 that extend through holes in the channel members and through vertical holes at selected locations through the cross frame members so that the channels can be disassembled from the cross frame members for compact packaging. The first and second elongated bicycle support members 12 and 12' are mounted by bracket means 27, 27' respectively on the first and second cross frame members 11, 11' for swinging movement in a generally upright plane intermediate the channels from a lower folded position adjacent the level of the channels as shown in FIG. 6, to a raised bicycle support position in which the elongated bicycle support members extend upwardly at an acute angle to the horizontal and cross each other at a location intermediate their ends, as shown in FIGS. 1-5. A fastener comprising a headed bolt 28 extends through openings formed in the elongated bicycle support members 12, 12' at their crossing location to detachably interconnect the cross frame members, and a wing nut 29 is provided for releasably securing the bolt. In the preferred embodiment illustrated, the bicycle support members 12, 12' are formed of tubular stock and have lower end portions 12a, 12a' respectively curved to extend laterally therefrom and provide a lateral mounting foot, and an integral upper end portion 12b, 12b' respectively curved to extend laterally therefrom and provide a lateral bicycle mounting arm. In the embodiment illustrated, the mounting foot and bicycle mounting arm extend laterally from the same side of the bicycle support member, it being understood that the mounting foot and arm could extend laterally from relatively opposite sides if desired. The bicycle support member 12 and 12' have bicycle engaging clamps adapted to engage a portion of the frame of the bicycle when its wheels rest in a respective one of the channels, to support the bicycle in a generally upright position. In the embodiment illustrated, the bicycle engaging clamps are in the form of J-bolts 33, 33' respectively that extend through transverse openings in the arm portions 12b, 12b' and which are adjustable as by wing nuts 34 to clamp the bicycle frame to the respective arm. Resilient caps 35 are provided on the bicycle support arms to protectively cover the ends of the arms and to also provide a resilient surface for engaging the bicycle frame.

Figure 4:
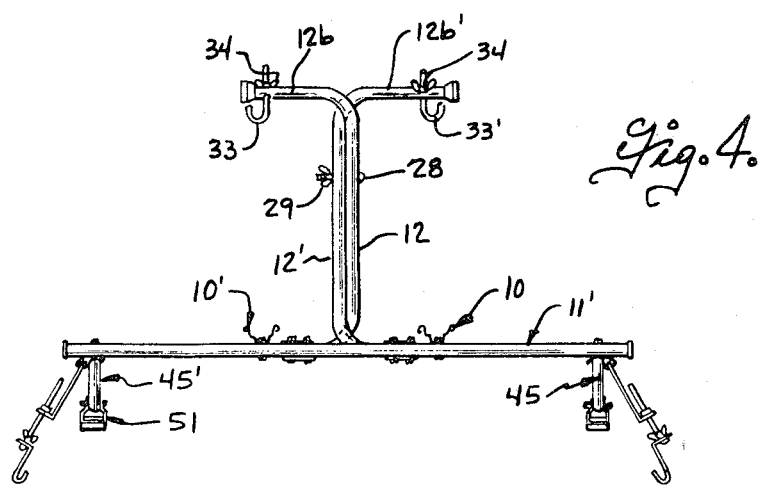
FIG. 4 is an end elevational view of the bicycle carrier.

As will be seen from FIGS. 3 and 4, the bicycle support arms and the bicycle engaging clamps thereon overlie the respective channel when the bicycle support members 12, 12' are in their raised bicycle supporting position. The brackets 27, 27' are advantageously arranged to swingably support the respective bicycle support member and to also allow limited movement of the bicycle support member in a direction laterally of the channels so that the support members can be lowered to a position between the channels as shown in FIG. 6 and in the lower portion of FIG. 5. The brackets 27, 27' each have a generally U-shaped cross-section and are detachably mounted as by a pair of bolts 38 that extend through openings in the legs of the U-shaped bracket members and through appropriately positioned vertical openings in the cross frame members 11,11'. The U-shaped brackets 27, 27' receive the lateral mounting portions 12b and 12b' on the respective bicycle support member to rotatably and slidably support the same for movement about a generally horizontal axis. The brackets are advantageously so arranged that the pivot axis of the arms is parallel to and horizontally offset to the inner sides of the respective cross frame members 11, 11', whereby the mounting feet on the support members are disposed adjacent the level of the cross frame members. When the connecting bolt 28 is removed, the bicycle support members can be swung downwardly and the bicycle support members can also be moved laterally relative to the respective channel from a first lateral position in which the clamp on the bicycle support arm overlies the channel as shown in FIGS. 3 and 4, to a second lateral position as shown at the lower portion of FIG. 5, in which the clamp means on the bicycle support members are offset inwardly from the respective channel. When the bicycle support members are shifted to their second lateral position, they can be moved to a lower position below the level of the top of the channels and rest on the remote cross frame member. The channels 10, 10' are preferably provided with a flange or rim along their upper edges, as described more fully hereinafter and, when the support members are lowered in their second lateral position, they are advantageously so constructed and arranged that the tip of the cap 35 on the end of each arm can be moved to a position underlying the flange or rim on the upper edge of the respective one of the channels as shown in FIG. 6 and the lower portion of FIG. 5, to releasably retain the support members in their lowered position.

Provision is made for releasably retaining the bicycle support members in their first and second lateral positions. As best shown in FIGS. 14 and 15, the web portions of the brackets 27, 27' have arcuate slots 27a and 27b at axially spaced locations therealong and a detent 41 is mounted on the foot portion of each bicycle support arm and yieldably biased by a spring 42 outwardly of the respective foot portion for engagement in either of the slots 27a or 27b. When the detent is in one of the slots 27a, it retains the bicycle support member in a first lateral position in which the arm 12b on that support member overlies the channel, and when the detent is in the other slot 27b it laterally retains the bicycle support member in a second lateral position in which the arm 12b on the bicycle support member is disposed between the channels. The slots 27a, 27b, however, allow vertical swinging movement of the respective bicycle member in either lateral position.

The cross frame members 11, 11' are attached to and supported on side support frames 45, 45'. The side support frames 45, 45' are each advantageously formed of a one-piece tube having a generally straight base portion 45a, first and second U-shaped end portions 45b and 45c at opposite ends of the base portion, and first and second oppositely projecting end portions 45d and 45e that are spaced above the base portion. The ends of the cross frame member 11 are attached to the projecting end portions 45d of the side frames 45 and 45' respectively, by bolts 47 that extend through openings in the cross-frame member and in the projecting end portion. Similarly, the ends of the cross-frame member 11' are attached to the projecting end portions 45e of the side support frames 45 and 45' respectively by bolts 47' that extend through openings in the ends of the cross frame members and in the projecting end portions of the side frames. In order to enable adjustment of the spacing between the side support frames to accommodate roofs and deck lids of different widths, each of the cross frame members 11,11' is provided with a plurality of openings at spaced locations along the end portions thereof, as best shown in FIGS. 1, 3 and 4.

Vehicle engaging feet 51 are attached to the side support frames to support the carrier on the roof or deck lid of an automobile. As best shown in FIGS. 12 and 13, the vehicle engaging feet comprise generally U-shaped metal brackets having a generally flat web portion 51a, and spaced leg portions 51b that are spaced apart a distance to receive the base portion 45a of a side support grame therebetween. The legs are attached to the base portion of the side support frames by a single bolt 52 that extends through a vertically elongated opening 51c in each of the legs 51b, and through a generally horizontal opening in the base portion of the respective side frame. A resilient pad 53, formed of rubber or the like overlies the web portion 51a and is secured thereto as by generally L-shaped retainer flanges 53a formed integrally with the pad 53 and which extend through slots 51d in the web portion of the foot bracket. As will be seen from FIGS. 12 and 13, the vehicle engaging feet can pivot in a plane lengthwise of the respective side frame about the axis of the bolt 52 and can also pivot a limited amount in a direction crosswise of the side frame by reason of the vertically elongated slots 51c, so that the underside of the foot can conform to the longitudinal and transverse curvature of the automobile at the point of contact therewith. As best shown in FIGS. 1 and 2, the base portion of the side frame members 45, 45' are provided with a plurality of horizontally disposed holes at spaced points therealong to allow mounting of the vehicle engaging feet at different locations along the side frame members and also allow mounting of additional vehicle engaging feet as may be desired to more evenly distribute the carrier weight over the surface of the vehicle.

A plurality of vehicle attaching hook assemblies are provided for securing the carrier to the roof or deck lid of the automobile. One vehicle attaching hook assembly is attached to each of the projecting end portions 45d and 45e of each of the side support frames and extends downwardly and outwardly therefrom for engaging an edge portion of a roof or deck lid of an automobile. The vehicle engaging hook assemblies have an all metal construction and each include a rigid hook member 52, a rigid attaching member 53, a swivel bracket 54 for connecting the attaching member to the side frame member, and an adjusting bolt 55. As best shown in FIGS. 10 and 11, the rigid hook member 52 includes a shank portion 52a, a hook portion 52b at the lower end of the shank portion, and a lateral flange portion 52c at the upper end of the shank portion. The attaching member 53 includes a shank portion 53a, a lateral flange 53b at the lower end of the flange portion and a slot 53c adjacent its upper end for receiving the swivel attaching member 54. The swivel attaching member is formed of a flat metal strap which is folded back upon itself and formed with an eye 54a that extends through the slot 53c in the attaching member to swingably support the attaching member. As best shown in FIG. 10, bolt receiving openings 54b are formed in the overlapping portions of the member 54 to receive the shank portion of a bolt for attaching the same to the projecting end portions of the side frame. As best shown in FIG. 1, the overlapping portions of the member 54 are interposed between the side frame members 11, 11' and the respective end portion 45d and 45e, and the same bolts 47, 47' that connect the cross-frame members to the side frame can also be utilized to connect the members 54 to the side frames. However, the deck lids on some automobiles are very short and at least one of the projecting end portions 45e on each of the side frames 45, 45' is formed to extend a substantial distance beyond the point of attachment of the cross frame member thereto, and additional vertically disposed openings are provided in the projecting end portion 45e of each of the side frames, as shown in FIGS. 1 and 3, to enable attachment of the vehicle engaging hook assembly forwardly of the rear cross frame member 11' for shorter trunks. A separate bolt must be utilized to attach the vehicle engaging hook assembly to the projecting end portions of the side support frames at a location forwardly of the rear cross frame member 11'. Preferably, the vehicle engaging hook assemblies are attached to the projecting end portion of the respective cross frame member at a location directly above one of the vehicle engaging feet on the base portion 45a.

The adjusting bolt 55 extends upwardly through the lateral flange 52c on the hook 52 with the head 55a on the bolt underlying the under side of the flange portion. The bolt also extends upperwardly through the lateral flange 53b on the attaching member 53 and a nut 57 is threaded on the bolt to engage the upper side of the flange 53b to adjust spacing between the hook and attaching members. A lock nut, conveniently in the form of a wing nut 58 is threaded on the bolt 55 intermediate the hook and attaching members and is adapted to be tightened against the upper side of the flange portion 53c of the hook member, to rigidly clamp the bolt to the hook member after the assembly has been adjusted. With this arrangement, the hook member is maintained in fixed relation to the bolt and the bolt is held against turning.

Figure 9:
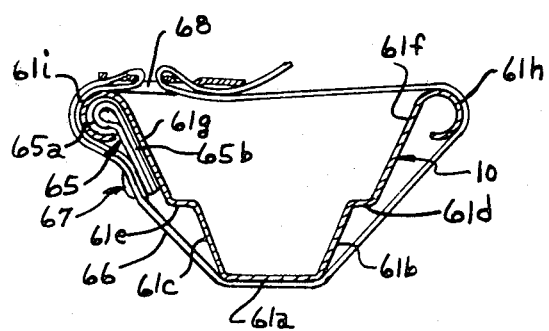
FIG. 9 is a transverse sectional view through one of the bicycle wheel receiving channels and illustrating the adjustable wheel attaching member on the channels.

The size of the bicycle tires varies from about 1¼" to 1⅜" for light weight bicycles to about 1¾' for mid-weight bicycles and to about 2¼" for some motocross bicyles. The wheel receiving channels 10, 10' are arranged to receive tires over the above range of tire sizes and, to firmly grip the sides of the tires. The wheel receiving channels in bicycle carriers have heretofore been made with a U or truncated V cross section. An improved wheel receiving channel having a stepped cross-sectional configuration is disclosed. The step in the channel stiffens and rigidifies the channel against the lateral forces impressed by the bicycle tires and also improves lateral gripping of a wide range of tire sizes. As the angle between the sides of the channel is increased, the lateral gripping of the bicycle tire by the channel decreases. It has been found that the channels will firmly grip the side walls of the tires when the angle of divergence of the side walls is not substantially greater than 50° and preferably of the order of 45° to 50°. The wheel channels 10 and 10' have an angle of divergence that is less than 50° and are stepped to accommodate the above range of bicycle tire sizes. A full scale cross section of the wheel receiving channel is shown in FIG. 9. The channels have a generally flat base portion 61a, lower upwardly diverging side wall portions 61b and 61c, lateral outwardly extending shoulder portions 61d and 61e at the upper edges of the lower side wall portions and upper side wall portions 61f and 61g that extend upwardly and outwardly from the shoulder portions 61d and 61e. The base portion 61a has a width narrower than the transverse width of the narrowest bicycle tire and preferably about ⅞", and the lower side wall portions 61b and 61c diverge upwardly relative to each other at an included angle of the order of 45° and are spaced apart at their upper ends a distance slightly less than the undeformed width of light weight bicycle tires and preferably about 1⅛" to firmly grip the side walls of the light weight bicycle tires when they rest in the channel. The lateral portions 61d and 61e are spaced above the base portion about ½ inches and provide a stepped increase in the width of the channel to about 1 7/16" which is less than the width of the undeformed midweight bicycle tires, and the upper side wall portions 61f and 61g diverge upwardly relative to each other at an included angle of the order of 45° to firmly grip larger motocross tires therebetween, when the tire is resting on the shoulders 61d and 61e. The upper edges of the upper side wall portions are spaced above the flange portions 61d and 61e about ¾ inches and the upper edges are spaced apart a distance less than the undeformed width of motocross tires and preferably about 2⅛ inches. The upper edges of the channels are provided with rolled rims on at least one and preferably on both longitudinal side edges, which rims are designated 61h and 61i and terminate with their lower edges spaced from the outer surface of the respective side wall portion of the channel a distance less than the internal width of the rolled rim. This arrangement is advantageous in that it rigidifies the channel and also disposes the edges of the channel at a location where it is not likely to be contacted by the user. In addition, the rolled rim provides a laterally opening guide passage along the outer side of the channel to slidably retain a wheel anchor member on the channel for adjustment of the wheel anchor member lengthwise of the channel. As shown in FIGS. 9 and 16, the wheel anchor member includes a slide member 65 having an enlarged portion 65a that is slidably received in one of the rolled rims and a shank portion 65b that extends outwardly from the rolled rim. A means such as a flexible strap 66 is secured to the slide member as by a fastener 67 and a buckle 68 is secured to one end of the strap and adapted to adjustably receive the other end of the strap.

The carrier shown in FIGS. 1-4 is arranged to support two bicycles on the central portion of the cross members. The carrier can also be arranged to support four bicycles utilizing two pairs of bicycle wheel receiving channels and two pairs of bicycle support members, mounted adjacent opposite end portions of the cross frame members as shown in FIG. 5. The wheel receiving channels and bicycle support members in FIG. 5 are the same as those previously described in connection with FIGS. 1-4 and like numerals are used to designate corresponding parts. In addition, the cross frame members 11 and 11' shown in the embodiments of FIGS. 1-4 are advantageously provided with the necessary additional vertically disposed holes in the cross frame members, to enable mounting of the two pairs of channels and the brackets 27, 27' of the associated pairs of bicycle support members in proper relation with each other, but adjacent the end portions of the cross frame members.

Figure 7:
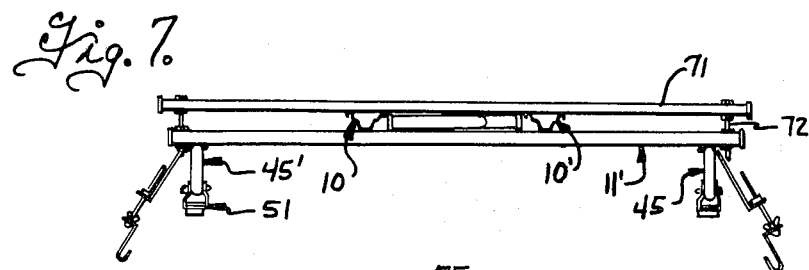
FIG. 7 is a rear elevational view of the bicycle carrier with the bicycle support frame folded and with article carrier bars mounted on the carrier.
Figure 8:
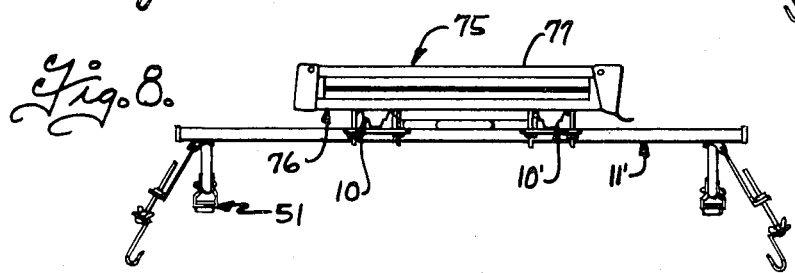
FIG. 8 is a rear end elevational view of the bicycle carrier with the bicycle support frame folded and with a ski rack mounted on the carrier.

When the bicycle support members are folded, the overhead clearance required above the carrier is markedly reduced so that the vehicle can be driven into a garage without removing the carrier, even when the carrier is mounted on the roof of the vehicle. In addition, folding of the arms reduces wind resistance of the carrier, when the carrier is not being used to transport a vehicle. Further, since the bicycle support members fold to a position between the channels and below the upper surface of the channels, the carrier can be used to carry other articles. For example, articles such as luggage can be supported directly on the tops of the channels and secured thereto as by straps, rope or the like. Alternatively, a pair of cross bars 71 such as shown in FIG. 7 can be mounted to overlie the channels with their ends secured as by bolts 72 to the cross frame members, to enable transporting of long articles such as ladders, light boats, etc. As shown in FIG. 7, nuts are provided on the bolts 72 to space the ends of the cross bars 71 above the respective cross frame member. In addition, the carrier can be converted as a ski carrier by mounting a ski rack 75 on the channels, as shown in FIG. 8. The ski rack includes a lower rack member 76 that is secured as by clamp bolts to the channels and has a means such as a hingedly connected upper ski rack member 77 for securing the skis to the lower rack member.

From the foregoing it is thought that the construction and use of the vehicle mounted carrier will be readily understood. The carrier when disassembled, can be compactly packaged for economical storage and transportation. The channels 10, 10' are attached through the cross frame members by bolts at appropriate locations along the cross frame members and the side support frames 45, 45' can be attached at different positions along the end portions of the cross-frame members to accommodate roofs and trunk hoods of different widths. The bicycle support members 12, 12' are mounted by the brackets 27, 27' for swinging movement between a folded position as shown in FIG. 6 and a raised position as shown in FIGS. 1-4. When in their raised position, they are adapted to support bicycles resting in a respective one of the channels and, when folded, the bicycle support members are disposed between the channels. When the bicycle support members are in their lowered position, the overhead clearance is reduced so that the vehicle can be driven into a garage and, in addition, the carrier provides an unobstructed surface above the top of the channels. This enables use of the carrier for carrying other objects either directly on the channels, or by cross bars or ski racks that overlie the channels and are secured to the carrier. When the support members 12, 12' are in their lower or folded position, the tip of the resilient cap 35 on each support member can be positioned to underlie the rim on a respective one of the channels, to releasably retain the support members in their folded position.

The vehicle engaging feet 51 can be secured to the respective side frame members at different locations therealong to accommodate deck lids of different length and at least one of the vehicle engaging hood assemblies can be secured at different locations along the projecting end portion 45e of the side frame members to accommodate deck lids of different length. The vehicle engaging hook assemblies have an all metal construction which is adapted to firmly secure the carrier to the vehicle, while enabling quick attachment and removal. When the lock nut 58 is tightened against the lateral flange portion, on the hook member, it holds the hook member in rigid relation with the bolt while also holding the bolt against turning to provide a laterally rigid attachment.

The embodiments of the invention in which an exclusive property or privilege is claimed are defined as follows:

1. In a bicycle support device including an elongated channel for receiving a wheel of a bicycle, means for supporting a bicycle in a plane generally bisecting the channel when the bicycle wheel is resting in the channel, the improvement wherein the channel has a stepped V-shaped cross-section and includes a base wall, upwardly diverging lower side wall portions, lateral flange portions extending outwardly from the upper edge of the lower side wall portions, and upwardly diverging upper side wall portions on the outer edges of the lateral flange portions, the upper and lower side wall portions diverging at an included angle of less than 50°.

2. A bicycle support device according to claim 1 wherein said channel has outwardly rolled rims along the upper edges of said upper wall portions, said outwardly rolled rims each extending through an arc of substantially greater than 180° and each having its free edge spaced from the respective outer side of the upper side wall portions.

3. A bicycle support device according to claim 2 including a wheel retaining anchor having means adapted to extend through a bicycle wheel and across the open side of the channel to retain the wheel in the channel, and slide means on the wheel retaining anchor having an enlarged head portion slidably disposed in the rolled rim to prevent detachment of the wheel retaining anchor from the channel while allowing slidable adjustment of the wheel retaining anchor along the channel.

4. A bicycle support device according to claim 3 wherein said wheel retaining anchor includes a flexible strap attached to said slide means.

5. A bicycle support device according to claim 2 including wheel engaging means slidably mounted in said rolled rim for slidable adjustment in a direction lengthwise of the channel.

6. A bicycle support device according to claims 1 or 2 wherein lower side wall portions are spaced to laterally grip light weight 1¼ inch bicycle tires supported on the base wall and said upper side wall portions are spaced to laterally grip large size 2¼ inch bicycle tires supported on the lateral flange portions.

7. A bicycle support device according to claims 1 or 2 wherein said lower side wall portions are spaced apart about ⅝ inches at said base and about 1⅛ inches at said lateral flange portions, and said upper side wall portions are spaced apart about 1 7/16 inches at said lateral flange portions.

8. In a bicycle support device included an elongated channel for receiving the front and rear wheel of a bicycle, an outwardly rolled rim along at least one edge of the channel, the edge of the rolled rim being spaced from the outer side of the channel a distance less than the internal width of the rolled rim, a wheel retaining anchor having means adapted to extend through a bicycle wheel and across the open side of the channel to retain the wheel in the channel, and follower means on said wheel retaining anchor having an enlarged head portion slidably disposed in said rolled rim to prevent detachment of the wheel retaining anchor from the channel while allowing slidable adjustment of the wheel retaining anchor along the channel.

9. A bicycle support device including an elongated channel having a base wall portion and relatively diverging side wall portions for receiving a wheel of a bicycle, means for supporting a bicycle in a plane generally bisecting the channel when the bicycle wheel is resting in the channel, an outwardly rolled rim along the upper edge of at least one of the side wall portions of the channel, the rolled rim extending through an arc of substantially greater than 180° and having its free edge spaced from the outer side of the associated side wall portion of the channel, and a wheel engaging means slidably mounted in said rolled rim for slidable adjustment in a direction lengthwise of the channel.

10. A bicycle support device according to claim 9 wherein an outwardly rolled rim is provided on the upper edge of each of the side wall portions of the channel.

* * * * *